Figure 1:
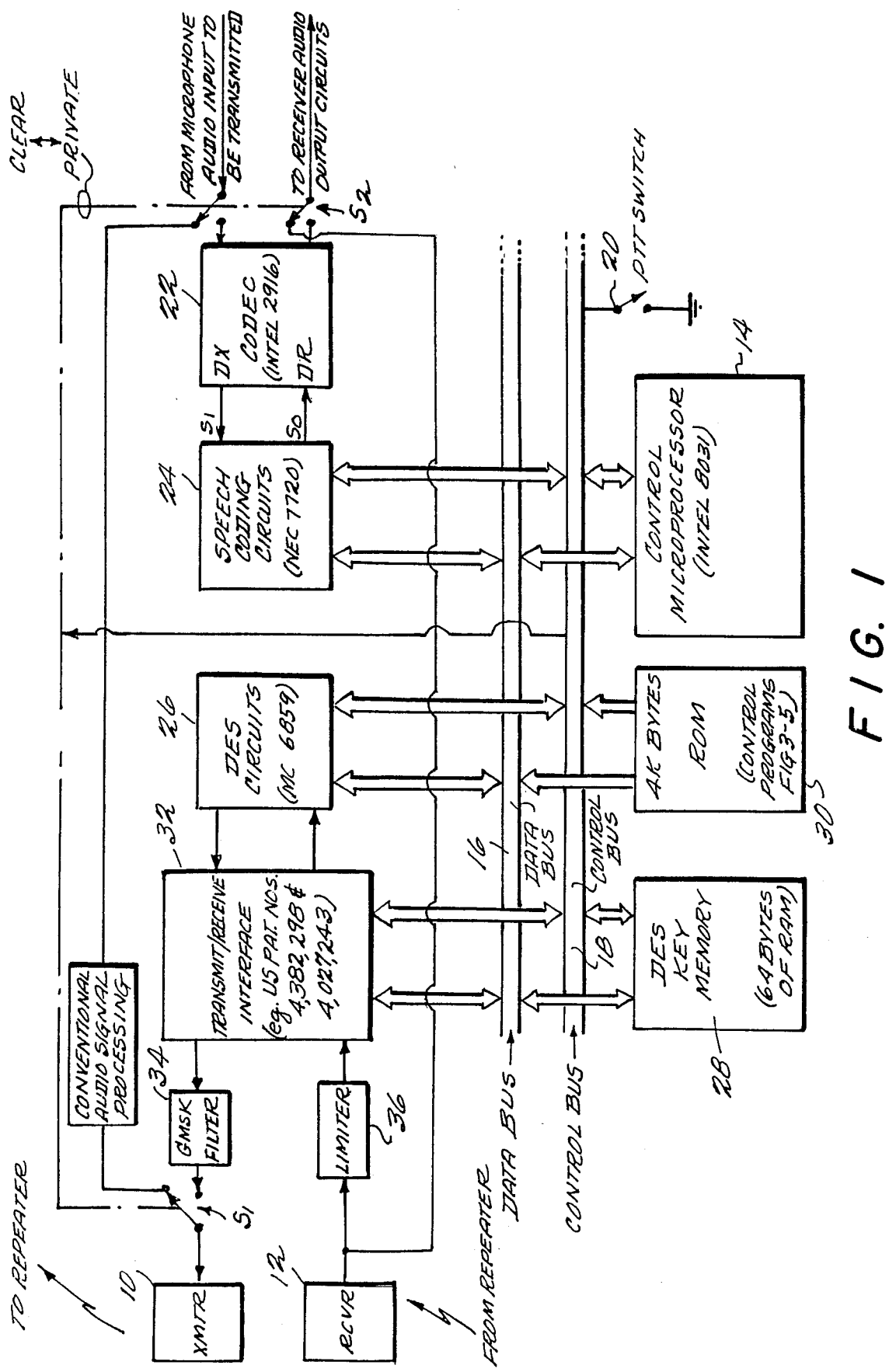

United States Patent [19]

Szczutkowski et al.

[11] Patent Number: 4,757,536

[45] Date of Patent: Jul. 12, 1988

[54] METHOD AND APPARATUS FOR TRANSCEIVING CRYPTOGRAPHICALLY ENCODED DIGITAL DATA

[75] Inventors: Craig F. Szczutkowski, Forest; Satish Kappagantula, Lynchburg; Eugene H. Peterson, III, Forest, all of Va.

[73] Assignee: General Electric Company, Lynchburg, Va.

[21] Appl. No.: 661,733

[22] Filed: Oct. 17, 1984

[51] Int. Cl.$^4$ ............................................. H04L 9/00
[52] U.S. Cl. ............................................ 380/48; 380/49
[58] Field of Search .................... 178/22.17; 370/29; 340/825.20, 825.21, 825.47; 375/116, 114; 380/48, 49

[56] References Cited

U.S. PATENT DOCUMENTS

| | | | |
|---|---|---|---|
| 3,798,378 | 3/1974 | Epstein | 375/114 |
| 3,801,956 | 4/1974 | Braun et al. | 375/116 |
| 4,001,693 | 1/1977 | Stackhouse | 375/114 |
| 4,027,243 | 5/1977 | Stackhouse et al. | 375/114 |
| 4,249,165 | 2/1981 | Mori | 375/114 |
| 4,267,592 | 5/1981 | Craiglow | 370/29 |
| 4,322,576 | 3/1982 | Miller | 178/22.17 |
| 4,369,443 | 1/1983 | Giallanza et al. | 340/825.47 |
| 4,382,298 | 5/1983 | Evans | 371/6 |
| 4,418,425 | 11/1983 | Fennel, Jr. et al. | 178/22.17 |
| 4,434,323 | 2/1984 | Levine et al. | 178/22.17 |

OTHER PUBLICATIONS

Smith M. J. T. et al., "A Procedure for Designing Exact Reconstruction Filter Banks for Tree-Structured Subband Coders", Proceedings of the IEEE International conference on Acoustics, Speech and Signal Processing, Mar. 1984, vol. 2, pp. 27.1.1-27.1.4.
Barnwell, T. P. et al., "A Real Time Speech Subband Coder Using the TMS32010".
Fjallbrant, T. et al., "A Speech Signal ATC-system With Short Primary Blocklengths and Microprocessor-based Implementation", pp. 357-363.
Jakes, W. C., "Microwave Mobile Communications", J. Wiley and Sons, New York, (1974).
Boddie, J. R. et al., "Adaptive Differential Pulse-Code-Modulation Coding", The Bell System Technical Journal, vol. 60, No. 7, Sep. 1981, pp. 1547-1561.
Crochiere, R. E. et al., "A 9.6 Kb/s DSP Speech Coder", The Bell System Technical Journal, vol. 61, No. 9, Nov. 1982, pp. 2263-2288.
Croisier, A., "Progress in PCM and Delta Modulation: Block Companded Coding of Speech Signals", 1974 Int. Zurich Seminar, Proceedings.
Jonston, J. D., "A Filter Family Designed for Use in Quadrature Mirror Filter Banks", Proceedings 1980 Int. Conf. on Acoustics Speech and Signal Processing, Denver, CO, Apr. 1977, 291-294.
Max J., "Quantizing for Minimum Distortion", IRE Trans. Information Theory, IT-6 (Mar. 1960), 7-12.
Esteban, D. and Galand, C., "Application of Quadrature Mirror Filters to Split Band Voice Coding Schemes", Proc. 1977 Int. Conf. on Acoustics, Speech and Signal Processing, Hartford, CT., (May 1977) 191-195.

(List continued on next page.)

Primary Examiner—Salvatore Cangialosi
Assistant Examiner—Aaron J. Lewis
Attorney, Agent, or Firm—Nixon & Vanderhye

[57] ABSTRACT

Method and apparatus are disclosed for transceiving digital control and cryptographically encoded data signals in a unique format. The format includes frame synchronization, cryptographic synchronization and selective signalling (addressing) information both in a preamble portion to an entire message and recurrently at regular intervals throughout a message of encrypted digital voice signals. This arrangement permits successful late entry and/or synchronization recovery (both frame and cryptographic synchronization recovery) in an addressable selective signalling type of private radio communication system even if such synchronization is never acquired from the preamble (e.g. because of a long radio transmission channel fade or the like) or in the event such synchronization is temporarily lost after the preamble has already occurred.

35 Claims, 5 Drawing Sheets

OTHER PUBLICATIONS

Cummiskey, P., Jayant, N. S. and Flanagan, J. L., "Adaptive Quantization in Differential PCM Coding of Speech", Bell Syst. Tech. J., 52 (Sep. 1973) 1105–1118.

Goodman, D. J. and Wilkinson, R. M., "A Robust Adaptive Quantizer", IEEE Trans. Comm., COM-23 (Nov. 1975), 1362–1365.

Crochiere, R. E., Webber, S. A. and Flanagan, J. L., "Digital Coding of Speech in Subbands", Bell Syst. Tech. J., 55 (Oct. 1076), 1069–1085.

Crochiere, R. E., "On the Design of Sub-bands Coders for Low-Bit-Rate Speech Communication", Bell Syst. Tech. J., 56 (May–Jun. 1977), 747–770.

Crochiere, R. E. "Digital Signal Processor–Sub-band Coding", Bell Syst. Tech. J., 60 (Sep. 1981), 1633–1653.

SYNC ACQUISITION SUBROUTINE

LATE ENTRY SUBROUTINE

METHOD AND APPARATUS FOR TRANSCEIVING CRYPTOGRAPHICALLY ENCODED DIGITAL DATA

This invention relates to method and apparatus for transceiving digital signals. Although generally usable in any transmission media (e.g. wire lines using modems), it finds especially advantageous application over a radio communication channel. In particular, it is related to systems in which digitized cryptographically encoded voice (or other) data signals as well as suitable digital synchronization and/or other digital control signals are transmitted on the same communication channel with the digitized and encrypted voice data signals.

This application is related to other commonly assigned copending applications claiming other inventions contemplated for combined use in the commercial embodiment of this invention:

Ser. No. 661,733, filed concurrently herewith to Szczutkowski et al entitled "Cryptographic Digital Signal Transceiver Method and Apparatus".

Ser. No. 661,598, filed concurrently herewith to Zinser entitled "Hybrid Subband Coder/Decoder Method and Apparatus".

Ser. No. 661,740, filed concurrently herewith to Szczutkowski entitled "Method and Apparatus for Efficient Digital Time Delay Compensation in Compressed Bandwidth Signal Processing".

The disclosure of these related applications is hereby expressly incorporated by reference. Although not required to practice the invention claimed in the present application, the presently preferred exemplary embodiment does utilize these related inventions as will be explained below.

Transceiving digital control and message data signals over radio communication channels is already well known in the art. For example, reference may be had to commonly-assigned U.S. Pat. No. 4,027,243—Stackhouse et al which describes a form of digital message generator for a digitally controlled radio transmitter and receiver in a radio communication system. Provisions are made for acquiring bit synchronization as well as word synchronization (including the multiple transmission of address information in complemented and uncomplemented form) in each of a steady succession of digital command messages transmitted between radio station sites. A modem circuit capable of detecting a 2 out of 3 voted Barker code sync word for frame synchronization is included in the Stackhouse et al system.

Cryptographic encoding of digitized speech signals is also well known in the prior art. For example, the Data Encryption Standard (DES) utilized in the presently preferred exemplary embodiment of this invention is itself well known and more fully described in detail in the following printed publications:

"Federal Information Processing Standards" Publication No. 46, Data Encryption Standard, U.S. Department of Commerce, NTIS, 5285 Port Royal Rd., Springfield, Va. 22161;

"Federal Standard 1027 GSA, Telecommunications, General Security Requirements For Equipment Using DES" available from NTIS or the U.S. Government Printing Office; and "Federal Information Processing Standards Publication No. 81, DES Modes of Operation" (the "output feedback mode" is utilized in the presently preferred embodiment of this invention), also available from NTIS or the U.S. Government Printing Office.

Typically, as in DES, encoded digital voice signals are transmitted in blocks or "frames" of fixed size along with a progressively changing encryption "vector" which, when combined with appropriate secret "key" digital data, may be used to encode or decode digitized voice data (or any other type of digital data).

It is also known to provide automatic selective signalling within radio communication networks of various types. Sometimes a separate "control" channel is utilized for achieving the desired selective signalling functions (e.g. selection of available communication channels and selection of a desired subset of message recipients within the system).

However, for various reasons, in prior voice privacy systems utilizing digitized and cryptographically encoded voice data signals, truly automatic selective signalling capability is not believed to have been previously available. Nevertheless, it is highly desirable in many radio communication environments to have such selective signalling capability. For example, it may be very useful to selectively address one of plural repeaters that may be within range of a given transceiver which is generating or relaying such an encrypted digital voice message.

It is also believed highly desirable to permit late entry and/or synchronization recovery (both word and cryptographic synchronization recovery) in the context of a digital voice privacy radio communication system having true selective signalling capability.

As explained in Stackhouse et al, a radio frequency communication channel is a relatively noisy and sometimes unreliable environment. Impulse noise, multipath interference and signal fading are typical of the expected problems that must be successfully overcome.

The present invention utilizes a unique format of control and encoded voice digital signals which provides the above set forth desired features especially well in the context of a radio frequency communication channel. It follows, of course, that the same unique format is also advantageous for any other less onerous type of communication channel such as, for example, conventional telephone channels or wire lines (perhaps also using added conventional modems on each end of the channel).

Figure 2:
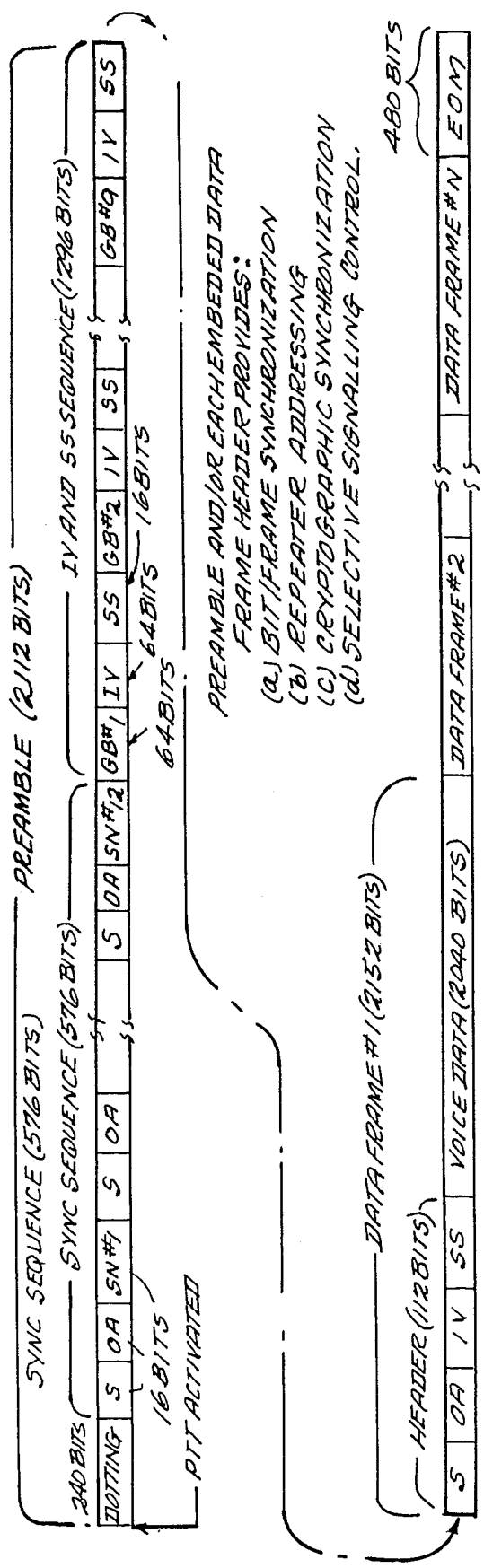
Figure 3:
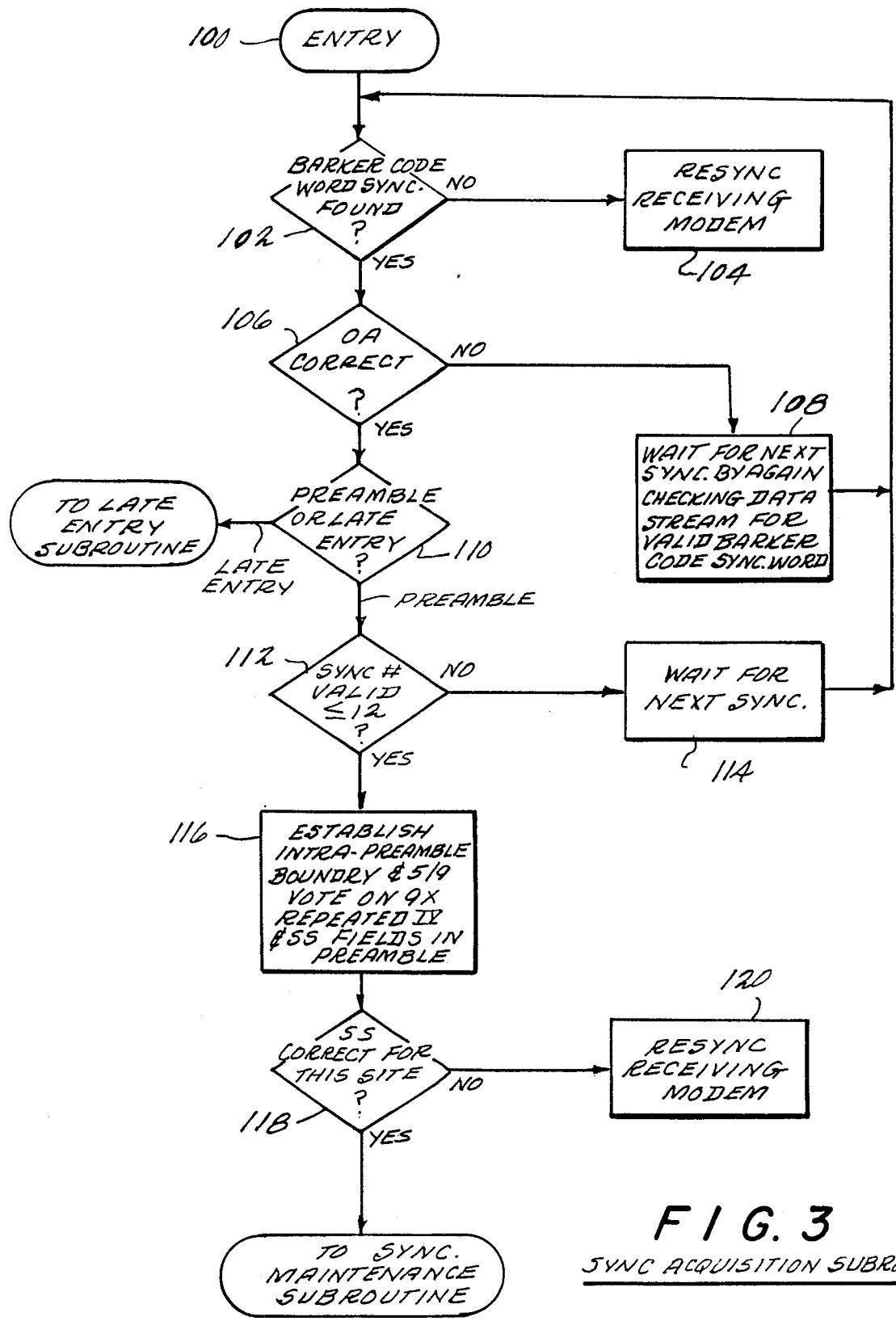
Figure 4:
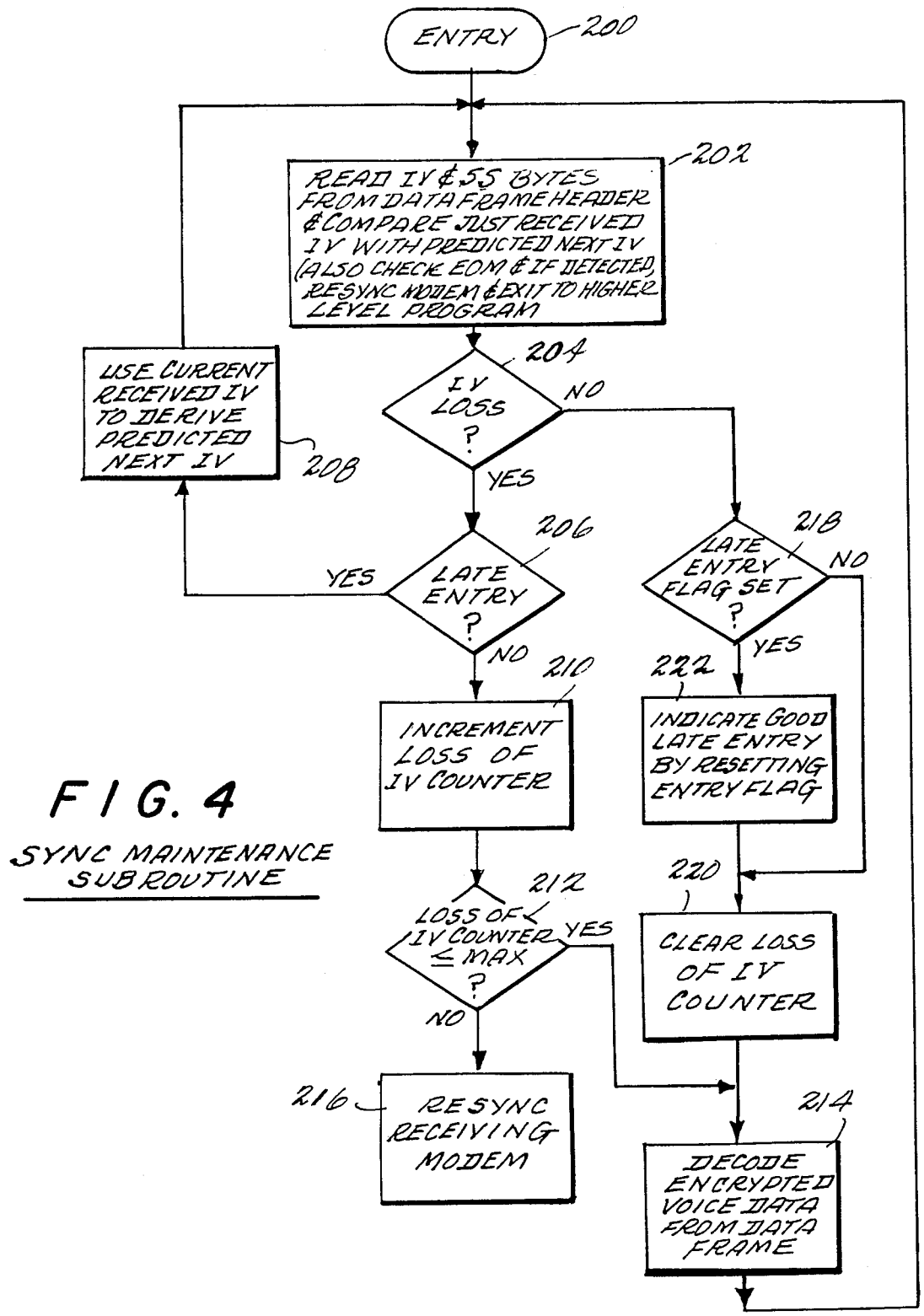
Figure 5:
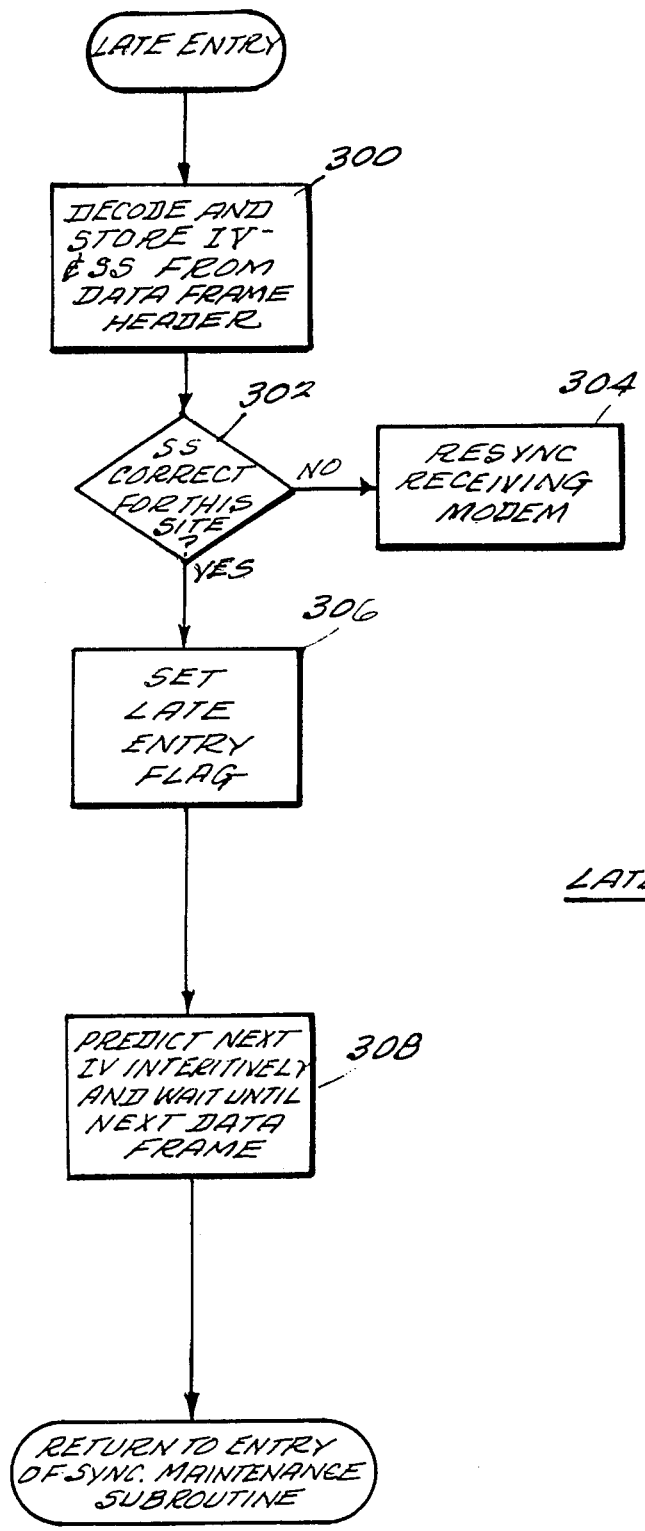

These as well as other objects and advantages of this invention will be more completely understood and appreciated by reading the following detailed description of the presently preferred exemplary embodiment of this invention in conjunction with the accompanying drawings, of which:

FIG. 1 is a schematic block diagram of an exemplary microprocessor controlled radio transceiver in accordance with this invention;

FIG. 2 is a schematic/graphic depiction of an exemplary preferred format or time sequence of the transmitted and/or received stream of digital signals in the exemplary embodiment of FIG. 1; and FIGS. 3-5 are simplified general flow block diagrams of exemplary computer programs that are embodied in the control program memory devices of the exemplary FIG. 1 system embodiment for the purposes of sync maintenance, acquisition and late entry.

The transceiver of FIG. 1 includes the usual radio frequency transmitter 10 and radio frequency receiver 12 (or any other communication channel transmitter and receiver such as, for example, the transmit lines and receive lines of a conventional wire line modem). As indicated in FIG. 1, the transceiver may be in communication with one or more repeaters or other transceivers or base station(s) over a radio frequency or other fsorm of communication channel. The clear/private switches S1, S2 (typically realized as conventional solid state controlled MUX switches used to switch analog signals under control of digital switch signals) may be provided so that the transceiver can operate in a conventional "clear" mode or alternatively, in the cryptographic or "private" mode. For example, when the switches are in the "clear" mode as shown in FIG. 1, the audio input coming from a microphone and to be transmitted is simply directly connected to transmitter 10 while the output of receiver 12 is directly connected to the usual receiver audio output circuit.

However, when switches S1, S2 are moved to the "private" mode position, then the microprocessor controlled remainder of the FIG. 1 circuitry is switched into operation between the usual receiver audio input-/output circuits and the usual radio frequency transmitter/receiver circuits 10, 12. In particular, the microprocessor controlled circuitry will take conventional audio input signals (e.g. from a microphone or audio amplifier or the like) and convert those to a stream of cryptographically encoded digital signals input at switch S1 to the modulator of transmitter 10. On the receiving side, a stream of digital signals arrives via the detector output of receiver 12 and is ultimately decoded and converted into analog audio signals at the lower contact of switch S2 before being passed onto the usual receiver audio output circuits (e.g. audio amplifiers, loudspeakers, etcetera).

In the preferred embodiment, the detector output of receiver 12 is constantly connected to the "private" digital decoding circuits (as shown in FIG. 1) so that the received signal can constantly be monitored. If a switch from "clear" to "private" mode is unexpectedly effected at the transmitter (e.g. initially or in the middle of an ongoing message), then the receiver "private" circuit will automatically begin the requisite decoding process and have decoded audio signals switched to the receiver audio output circuits automatically. This arrangement also makes it possible for the receiving set to automatically switch itself into the "private" mode wherever incoming digital signals are successfully decoded and in fact, this is contemplated for the preferred embodiment.

The overall architecture of the microprocessor control circuits shown in FIG. 1 is generally conventional. In particular, the heart of the system is a control microprocessor 14 (e.g. an Intel 8031 integrated circuit chip). Communication with the remainder of the digital circuitry is via the usual data bus 16 and control bus 18. The usual push-to-talk (PTT) switch 20 may be considered as one wire in the control bus 18 if desired. A manual clear/private mode switch used for selecting the mode of transmitted voice may also be one wire in the control bus 18 if desired. As should be appreciated, there is no need for a manual receive clear/private mode switch when automatic receive mode switching is performed as explained above. The system may include a conventional codec 22 (e.g. an Intel 2916 integrated circuit chip) and conventional speech coding circuits 24 in the form of a suitably programmed Digital Signal Processor (DSP) (e.g. an NEC 7720 integrated circuit chip) for converting audio signals to/from digital-analog form in accordance with known speech digitization and processing algorithms.

In the preferred exemplary embodiment, a hybrid subband coding technique is employed in accordance with the invention claimed in the related Zinser application. There the audio frequency band 180-2900 Hz is split into four octaves with the highest frequency band 1450-2900 Hz being subject to conventional block companded pulse code modulation (BCPCM) and the lower three subbands being subject to conventional adaptive pulse code modulation (APCM) digital bandwidth compression techniques. This plus the novel time delay compensation technique of Szczutkowski permit the speech coding to be carried out using but a single DSP chip 24. However, as should be understood, the use of such speech coding techniques is optional insofar as the presently claimed invention is concerned. The novel message formatting employed in the present invention may be utilized with any desired type of digital speech encoding algorithm or with any type of digital data (e.g. ASCII, etc.).

The Data Encryption Standard is implemented via conventional DES circuits 26 (e.g. an MC 6859 integrated circuit chip) and a conventional DES key memory 28 (e.g. 64 bytes of RAM). Suitable conventional ROM circuits 30 (e.g. 4 kilobytes) are also provided to physically embody the program control structure pertinent to the present invention as indicated in FIG. 1.

The transmit/receive interface circuits 32 are sometimes referred to as "modem" circuits and may also be of conventional design. They preferably include bit restoration circuits of the type described in commonly assigned U.S. Pat. No. 4,382,298—Evans. Although conventional clock recovery and up/down counter circuits can be employed with this invention, it is presently preferred to use the clock recovery circuits described in the copending commonly assigned Evans application Ser. No. 527,471 filed Aug. 29, 1983 and the up/down counter circuits described in the copending commonly assigned Evans application Ser. No. 527,470 filed August 29, 1983. Reference may also be had to the commonly assigned U.S. Pat. No. 4,027,243—Stackhouse et al for digital transmit/receive modem interface circuits suitable for use with radio frequency transmitters and receivers such as transmitter 10 and receiver 12 and for a hardwired Barker code sync word detector. In the preferred exemplary embodiment, the interface 32 may be placed in a "sync search" mode whereupon such a Barker code sync word detector is activated and which thereupon outputs a priority interrupt signal to control microprocessor 14 whenever such a sync word is detected.

A conventional Gaussian Minimum Shift Key (GMSK) filter 34 (e.g. a fourth order low pass Bessel filter having an about 7 kilohertz cut-off measured at the 3 dB points) is preferably included to process the stream of digital output signals before they are passed onto the modulator of transmitter 10 as should be appreciated by those in the art.

The output of receiver 12 (e.g. from an fm discriminator) is also preferably passed through a conventional limiter circuit 36 to eliminate d.c. bias effects that otherwise might be present in the output of the receiver discriminator. For example, the limiter 36 may utilize a simple comparator to compare the instantaneous incoming signal from receiver 12 with a running averaged value over some previous relatively short interval as should also be appreciated by those in the art.

The transmit/receive interface 32 may, for example, on the transmit side comprise a conventional parallel-to-serial shift register for generating a serial stream of digital binary signals to be transmitted. On the receive side, the transmit/receive interface 32 may typically utilize a digital phase locked loop for achieving bit synchronization and a hardwired correlator for recognizing a predetermined Barker code which may be used for achieving word synchronization.

The preferred time sequence of digital signals being transmitted by transmitter 10 or received via receiver 12 is schematically depicted in FIG. 2. This format or time sequence of digital signals is generated for transmission under program control of the microprocessor 14 and, in the receive mode, the control microprocessor 14 is also programmed (e.g. via ROM 30) so as to properly detect and decode the same time sequence or format of digital signals. This unique format permits initial and ongoing frame synchronization, repeater addressing, cryptographic synchronization and selective signalling. All four types of information are repetitively transmitted in a relatively long preamble portion for fade protection (e.g. the usual Raleigh fading which may be expected on radio frequency communication channels) and, in addition, all four types of information are repeatedly retransmitted at regular intervals within the encrypted voice data stream. Fade protecting the preamble by multiple repeats and/or other techniques provides a very high probability of correct initial synchronization and addressing functions. Repeating all four types of information within the voice data stream permits late entry (in the event that the preamble is missed or unsuccessfully decoded) and/or permits recovery of synchronization (in the event that synchronization initially acquired from the preamble is subsequently lost before the end of a given message occurs).

When the transceiver of FIG. 1 is in the "private" mode and the PTT switch is activated, the preamble portion of the format shown in FIG. 2 is first transmitted so as to establish bit synchronization, word or frame synchronization, cryptographic synchronization and addressing (e.g. repeater and/or other selective signalling). Fade protection for deep fading (e.g. up to 45 milliseconds) is preferably provided by multiple repeats of a synchronization sequence as well as the initialization vector (IV) and selective signalling (SS) signals.

The initial "dotting" sequence is merely an alternating 1,0 pattern of digital signals (e.g. 10101010 ...) and is continued for a "transmitter wake-up time" (e.g. 25 milliseconds). During this initial "dotting" time, the receiver circuits can quickly obtain bit synchronization. For example, conventional hardwired bit synchronization circuits might be utilized in the transmit/receive interface 32 as previously described so as to automatically obtain and remain in bit synchronization with the incoming serial stream of digital signals. Those skilled in the art will appreciate that logic 1's and 0's may be interchanged throughout this discussion since they refer only to two binary levels and not to a rigid voltage polarity or magnitude.

The synchronization sequence next occurs for a time duration equal to the sum of: (a) the maximum expected fade duration, (b) the bit duration required to ensure 99% synchronization acquisition, and (c) the typical time required for repeater turn-on to occur. The exemplary synchronization sequence includes 12 repeats of 48 bit synchronization groups, each of which groups includes a 16 bit synchronization word S (an 11 bit Barker code such as 11100010010 and 5 bits of fill or dotting), an 8 bit "outside address" (OA) repeated once in complemented form (which may alternatively comprise other internal data configurations such as a 5 bit repeater address repeated twice plus filler) to complete a second 16 bit field and a 5 bit sync number (SN) repeated three times (with the second repeat being in complemented form) plus 1 final bit of odd parity code so as to complete the third 16 bit field in a given 48 bit group. At 9600 baud, it requires approximately 60 milliseconds ((48×12)/9600) to transmit all 576 bits of the synchronization sequence in the preamble of FIG. 2.

Once a correct synchronization word S is decoded, the following OA and SN fields may be recognized by requiring that all the vectors within each field (2 in the OA field and 3 in the SN field) match (i.e. taking into account the complemented form of adjacent repeated vectors) to ensure proper frame synchronization and/or that sufficiently error free reception is being enjoyed. (Late entry is differentiated from preamble entry by the format of the OA field.) The proper synchronization number SN is reconstructed by voting 2 of 3 on the three 5 bit vector fields. The synchronization number data SN not only helps establish the current or instantaneous position within the synchronization sequence, it also helps ensure that the correct boundary is identified between the sync sequence and the following IV and SS signal sequence as shown in FIG. 2.

The IV and SS fields follow the synchronization sequence in the preamble of FIG. 2. This second control data sequence includes a 64 bit guard band (GB), a 64 bit initialization vector (IV) and a 16 bit selective signalling address (SS) repeated 9 times in the overall IV and SS sequence of 1296 bits depicted in FIG. 2. The 64 bit guard band GB provides fade protection while the 64 bit IV field is used to establish cryptographic synchronization in accordance with the conventional DES. The 16 bit selective signalling field SS provides group and individual selective signalling capability within a radio communication network.

The IV and SS sequence subsists for a time duration equal to the sum of: (a) the time required for transmitting the initialization vector IV, (b) the time required for selective signalling transmissions SS, and (c) the degree of fade protection desired for the SS/IV control data fields. In the exemplary embodiment, approximately 45 milliseconds of fade margin is provided in the IV and SS sequence of 1296 bits.

The selective signalling vector SS may be used for selective calling of individuals or groups using the same DES cryptographic key. Accordingly, truly selective signalling capability is provided within a cryptographic communication network. The 16 bit SS field may represent, for example, a user group with individual addresses therewithin so that users with the same cryptographic key nevertheless have the ability to further subdivide their calls to subsets or individual transceivers within their particular network. For example, the SS field may also be encrypted to facilitate selective signalling within a group of users having the same DES key while providing no information to a user with a different key (or an evesdropper).

The guard band GB may be used for additional message or signalling capabilities if desired but, in the present exemplary embodiment, it is merely filled with a dotting pattern. 64 bits of dotting was chosen so as to provide a fade margin of approximately 45 milliseconds.

The DES initialization vector IV conventionally contains 64 bits and is a pseudo-randomly generated initialization vector used by the conventional DES encryption algorithm to initialize the cipher-stream generation.

A "five-of-nine" vote is utilized for analyzing the 9 times repeated IV/SS data sequence. For example, at the receiver each of the nine sequential GB/IV/SS data fields is voted bit-by-bit on an at least five-out-of-nine basis. The voted results are stored as used as the correct IV/SS vectors for cryptographic synchronization and selective signalling purposes.

The preamble format of FIG. 2 is chosen so as to provide a 99% probability of correct reception in a radio frequency communication channel experiencing up to about 3% bit error rate (BER). In this analysis, fading is treated as a separate process and dealt with by interleaving redundant data (or left "open" by using all 1's or all 0's, any arbitrary pattern or simply dotted guard bands) along with repeated critical synchronization data as shown in FIG. 2. For example, the FIG. 2 format is designed so as to protect against data losses even though up to about 45 milliseconds of fading may occur on the radio frequency communication channel. The probability of correct reception for the required information is then the product of the probabilities of the individual fields.

Thus if Pch is the probability of the correct preamble reception, then $$Pch = (Pcs * Pcoa * Pcsn) * Pcss * Pciv \qquad \text{[Equation 1]}$$

where,

Pcs is the probability of correct sync S reception;
Pcoa is the probability of correct OA reception;
Pcsn is the probability of correct sync number SN reception;
Pcss is the probability of correct selective signalling SS address reception; and
Pciv is the probability of correct initialization vector IV reception.

Assuming a 3% BER and the FIG. 2 format:
(a) for a repeater receiver or a mobile receiver;

$$Pcs * Pcoa * Pcsn = 0.98964 \qquad \text{[Equation 2]}$$

(b) for a mobile receiver (the repeater may not require IV and SS);

$$Pcss * Pciv = 0.99978 \qquad \text{[Equation 3]}$$

(c) for the repeater, probability of correct acquisition is $$Pcra = 0.98964 \qquad \text{[Equation 4]}$$

(d) for a mobile, probability of correct reception of the preamble is $$Pcma = 0.98964 * 0.99978 \qquad \text{[Equation 5]}$$

$$Pcma = 0.98845 \qquad \text{[Equation 6]}$$

The format of FIG. 2 typically provides:
Initial entry time of about 250 msecs,
Rentry (in case of temporary sync loss)
Late entry capability
Probability of correct detection of the header > 99% at a channel BER of 3%
Protection against fades of up to about 50 msecs duration
Falsing rate of less than about once per week.

The output feedback mode of operation of the DES algorithm requires that a 64-bit vector be transmitted at least once per PTT activation. In the preferred embodiment, the 64 bit vector is transmitted once per frame to allow for re-entry or late entry. This vector is different for each transmission thereby constituting 1 out of $2^{64}$ possible vectors. The vector is called an initialization vector or IV.

The reconstructed SS and IV vectors are the result of voting at least 5-of-9 on the available group of 9 vectors as previously described. The process of voting at least 5-out-of-9 on the incoming data stream has the effect of improving the effective bit error rate (BER) of the channel. For a given channel error rate Pe, the probability of correct reception where the probability of correct IV and SS reception Pciv*Pcss can be calculated as:

$$Pcss*Pciv = \left[ \sum_{k=5}^{9} \binom{9}{k} (Pe)^k (1 - Pe)^{9-k} \right]^{80}$$

For Pe = 0.03 (3% BER), then Pciv*Pcss works out as 0.99978 or 99.98% probability of correct reception.

Correct sync S (11 bit Barker code) reception is ensured by repeating the 11 bits of the Barker code with a 5 bit fill continuously over a finite period. This time was chosen as the sum of the worst case (expected) fade duration and the time taken to repeat the sync pattern so that the probability of correct reception is at least 99% at a 3% BER.

The probability that 27 bits will be correct at a 3% BER, is simply $(1-0.03)^{27}$ or 0.439, i.e. the probability that the sync is corrupted is (1-0.439) or 0.561. Thus the probability that the sync is corrupted n times in a row is $(0.561)^n$ or the probability of correct sync under these conditions is $1-(0.561)^n$. This is required to be at least 0.99 in the exemplary embodiment. The value of n satisfying the above equation is at least 8 (12 is used in the exemplary embodiment and is thus more than ample). The probability of correct sync S and OA is 0.99902.

The probability of correct preamble reception under these conditions is Pch = Pcs * Pcsiv = 0.99902 * 0.99*0.99978 = 0.9899 = ~0.99.

Following the preamble shown in FIG. 2 are successive data frames, each of which includes a 112 bit header portion and 2040 bits of encrypted voice data. The header includes a single repeat of the sync word S, the outside address OA, the initialization vector IV and the selective signalling address SS. No sync count number SN is provided nor are multiple repeats provided in an attempt to keep the overall data frame length as low as possible (e.g. on the order of 225 milliseconds) and/or to keep the required data processing overhead to a minimum during the time it is necessary to also decode and otherwise process the incoming encrypted voice data.

Nevertheless, by inserting such a header into each data frame, enough information is regularly provided so as to allow for late entry into an ongoing message or conversation and/or so as to reestablish lost frame or cryptographic synchronization (e.g. as might occur from temporary loss of signal or multiple transmitting conditions or the like on a typical radio frequency communication channel). A synchronization maintenance control function in the receiver may thus monitor the ongoing received data frame header. It may permit a certain amount of "free wheeling" even if a bad header is sometimes detected since the critical cryptographic initialization vector IV can be predicted from the previously received (correct) IV. Once cryptographic synchronization has been completely lost, the preferred exemplary embodiment requires two valid received IV's (in consecutive data frames) to be detected before proper cryptographic synchronization is resumed.

As also depicted in FIG. 2, an end of message (EOM) signal is transmitted at the end of a message transmission (e.g. upon release of the PTT switch 20). The EOM signal is continued for about 50 milliseconds in the exemplary embodiment so as to allow for relatively long fades in the received signal while still ensuring that the EOM is properly decoded.

In the format of FIG. 2, the sync word S should preferably preceed the other associated fields (e.g. OA, IV, SS) so as to permit frame sync acquisition before the other fields are to be detected. However, the exact order of the remaining OA, IV, SS fields is essentially a matter of choice.

Those skilled in the art should be able to readily devise transmission control programs for the microprocessor 14 required to assemble and transmit data streams in accordance with the time sequences depicted in FIG. 2. However, since the reception processing control is somewhat more involved, an exemplary embodiment of suitable computer program subroutines is presented in FIGS. 3–5 for causing the microprocessor control system of FIG. 1 to properly receive and decode the time sequence of digital signals depicted in FIG. 2.

The receive control functions required by the digital signal format of FIG. 2 may be divided into two major functional computer program subroutines: (a) a synchronization acquisition subroutine as shown in FIG. 3, and (b) a synchronization maintenance subroutine as shown in FIG. 4. A lower level "late entry" subroutine shown in FIG. 5 is utilized in conjunction with the other programs of FIGS. 3 and 4 so as to permit successful late entry into an ongoing conversation.

A repeated hard-wired test is made for presence of the 11 bit Barker code synchronization word S in the transmit/receive interface 32 irrespective of the private/clear mode status thus enabling automatic reception of either DES encoded digital voice or normal analog voice transmissions. Then, whenever decoded voice is present, the control microprocessor 14 itself automatically switches 52 into a "private" receive mode. A suitable visual or other indicator of this automatically derived "private" mode may also be activated by the control microprocessor. (If desired, the transmit portion of switches S2, S2 may also be automatically switched to the "private" mode in readiness for any return transmission.) As will be recalled, the transmit/receive interface 32 of FIG. 1 is preferably hardwired so as to automatically recognize the appropriate Barker code word and to generate an appropriate priority interrupt signal for the microprocessor 14 which then abruptly switches control to entry point 100 of the sync acquisition subroutine.

Alternatively, the transmit/receive interface 32 may provide a simple multi-bit register through which the incoming bit stream passes and which is periodically sampled by microprocessor 14 at block 102. If the proper Barker code word is not yet received, then the incoming bit stream may be advanced by one or more bits in the interface buffer at 104 and another test made for the proper Barker code at 102. In the preferred exemplary embodiment, the test at 102 should always simply confirm that a proper Barker code sync word is present—since that is the condition upon which control is passed to entry point 100. If not, then the interface 32 is replaced in its sync search mode and control of microprocessor 14 is passed back to higher level programs until the next priority interrupt is produced by interface 32 signifying that another proper sync word S has been detected. As should be appreciated, the interface 32 is preferably wired to inhibit generation of any subsequent priority interrupt until it is again placed in a sync search mode. Otherwise, a priority interrupt would always be generated whenever an incoming S word occurs. It should also be recalled that bit synchronization is typically handled by conventional fixed hardware in the transmit/receive interface 32.

When a correct Barker code synchronization word S has been detected at 102, control passes to 106 where a check is made for a proper outside address OA. In other words, is the OA correct for the particular transceiver site in question? If not, then control is passed to wait loop block 108 where microprocessor 14 now waits for the next sync word S which is tested again at 102.

If both a valid synchronization word S and valid outside address OA are detected at blocks 102 and 106, then a test is made at 110 to determine whether the S and OA data just received comes from the preamble of FIG. 2 or from a data frame header which, in the latter case, would indicate that a late entry is being attempted to an ongoing message. As explained earlier, the OA field includes two 8-bit vectors. In the preamble, the second vector is the logical complement of the first vector. However, in the data frame header the second vector is merely a straightforward repeat of the first vector.

Accordingly, a test may be made at block 110 to see whether the second vector in the just received OA field is inverted. If it is, then exit is made to the late entry subroutine of FIG. 5 as indicated. If not, then a normal sync acquisition from the preamble is indicated and control is passed onto block 112 where a test is made to determine if the synchronization number SN is a valid number (e.g. do the three 5-bit vectors and odd parity code bit check out with respect to one another and, if so, is the indicated sync number less than or equal to 12?). If the sync number SN is not valid, then exit is taken via wait loop 114 back to block 102 to wait for the next valid Barker code synchronization word S.

However, if a valid synchronization number SN is detected at 112, then control is passed to block 116 where the data field boundaries within the preamble are now established (e.g. because one now knows which one of the 12 repeated S/OA/SN fields has just been successfully detected and where it is located in the interface buffer register). The nine repeated GB/IV/SS fields in the IV and SS sequence of the preamble are then received and a vote is taken among the nine repeats of the IV and SS data fields. In the exemplary embodiment, a simple majority vote (e.g. at least 5 out of 9) is taken on a bit-by-bit basis to determine the final IV and SS field values for later usage by microprocessor 14.

After the voted SS field is available, control is next passed to block 118 where the SS field is tested to make sure that it is correct for this particular transceiver/site. If not, then exit may be taken via block 120 where the receiving modem in interface 32 is again placed in the sync search mode where a search is undertaken for the next correct Barker code word.

Finally, if the entire sync acquisition subroutine of FIG. 3 has been successfully completed, then exit from block 118 will be made to begin actually decoding the data frames which follow so as to drive the receiver audio output circuits. However, since the first portion of each data frame in the exemplary embodiment is a header portion which repeats the S/OA/IV/SS fields, exit from the FIG. 3 subroutine may, if desired, simply be taken to the synchronization maintenance subroutine of FIG. 4 where control of the microprocessor 14 normally resides anyway during the ongoing receipt of a succession of data frames.

Upon entry to the sync maintenance subroutine of FIG. 4 at block 200, control is passed to block 202 where the IV and SS fields from the currently received data frame header are read into a buffer register and the just received cryptographic initialization vector IV is compared to the predicted next IV. As will be appreciated by those in the art, the conventional DES algorithm permits one to predict the next IV based upon the previous IV. For the very first data frame, the IV in the header should be the same as the IV already received and voted upon from the preamble. Thus, so as to accommodate the first data frame, an initial housekeeping operation might be performed (e.g. back in the sync acquisition subroutine so as to initially set the predicted next IV to be equal to the voted upon preamble IV).

Additionally, block 202 may include a test for the end of message character EOM since this would be a convenient place to make such detection. If detected, then the interface 32 may again be placed in the sync search mode and control of microprocessor 14 passed back to higher level programs.

The actual comparison of the currently received IV with the predicted next IV is depicted at block 204 in FIG. 4. If the two do not match, then an IV loss is indicated and control is passed to block 206 where a test is made to see if a late entry flag has previously been set (by the late entry subroutine of FIG. 5 to be discussed later). If the late entry flag was set, then exit is taken to block 208 where the current received IV is used to derive a predicted next IV and control is passed back to block 202.

On the other hand, if the late entry flag was not set, then control is passed from block 206 to block 210 where a "loss of IV" counter is incremented. The counter contents is then tested at 212 to see if it is less than or equal to some desired maximum. In the exemplary embodiment, the maximum may be set at a value up to 10. If the "loss of IV" counter has not yet exceeded the maximum permitted contents, then exit is made to block 214 where the currently received encrypted voice data field is decoded using conventional DES algorithms. The decoded results are then conventionally also passed on to codec 22 which drives the analog receiver audio output circuits as should now be appreciated by those in the art and control is passed back to block 202 of the sync maintenance subroutine for processing the next data frame of the incoming message.

If the "loss of IV" counter exceeds the maximum permitted value as tested at block 212, then this indicates a loss of sync and, as a result, the interface 32 is again placed in its sync search mode and control is passed back to higher level programs as indicated by block 216.

Under normal circumstances, when there is no IV loss as tested at block 204, then control is passed to block 218 where a test is made on the late entry flag. If the late entry flag has not been set, then control is passed directly to block 220 where the "loss of IV" counter is cleared (just in case it might have previously accumulated some content) and control is passed onto block 214 where the encrypted voice data field is decoded, etc. as previously described. On the other hand, if the late entry flag was set as tested at block 218, then the late entry flag is reset at block 222 so as to indicate a good late entry sync acquisition. As should now be appreciated, during normal message reception times, control of microprocessor 14 repeatedly passes about the loop comprising blocks 202, 204, 218, 220 and 214.

If exit is made to the late entry subroutine from block 110 of FIG. 3, then control is passed to block 300 of FIG. 5 where the IV and SS fields are decoded and stored from the currently received data frame header. A test is made at 302 to see if the SS field is correct for this particular transceiver/site. If not, then the interface 32 is again placed in its sync search mode and control is passed back to higher level programs as indicated by block 304.

On the other hand, if the SS field is detected as being correct at block 302, then the late entry flag is set at block 306 and the next initialization vector IV will then be iteratively predicted at block 308 in accordance with conventional DES algorithms and a wait loop maintained until the next data frame time whereupon a return is made to the entry of the sync maintenance subroutine in FIG. 4.

To summarize the control algorithm represented by the flowcharts of FIGS. 3-5, initial sync acquisition involves acquisition of the 11-bit Barker code to establish word synchronization. The hardwired interface circuits 32 detect the Barker code word and priority interrupt the microprocessor 14 whereupon control passes to the sync acquisition subroutine of FIG. 3. The repeater address or outside address field OA and the other following fields are then subsequently acquired and temporarily held in a suitable buffer storage. The information thus held in the buffer will have a unique characteristic identifying it as having come from the preamble or from the header of a regular data frame. In the exemplary embodiment, such differentiation is provided by causing the second or repeated vector in the outside address OA field to be inverted in the preamble but not inverted in the header of a regular data field. Thus, a test can be made at block 110 of FIG. 3 to determine whether the incoming S and OA fields originated from a preamble or from the header of a data frame.

If sync acquisition is made during the preamble (as should normally occur), the next occurring 16-bit SN field is grouped into three 5-bit fields and a single odd parity bit field. In the exemplary embodiment, the second 5-bit vector is inverted but otherwise the three 5-bit vectors should match if correctly received and the value of the 5-bit vector identifies which one of the 12 repeated synchronization packets (i.e. S/OA/SN) has just been successfully received. This permits the correct boundary to be established between the 576-bit sync sequence and the 1296-bit IV/SS sequence of the preamble. Once this boundary has been established, then the 9-way redundant GB/IV/SS data stream may be properly framed, received and a majority vote process performed so as to provide a degree of error correction in the resultant initially received IV and SS data fields. The error corrected SS address is then checked for proper identification and, if correct, then the error corrected IV may be used for DES decryption of the encrypted voice data field.

On the other hand, if successful sync acquisition is not made during receipt of a preamble to a message, then a "late entry" situation is indicated. This may occur, for example, because the receiver was somehow "late" in acquiring synchronization either by missing the preamble altogether or by having temporarily lost sufficient RF signal due to a long fade situation in a RF communication channel. In such case, the fields following the OA of the data frame header are the IV and SS fields. If the SS field correctly checks out (i.e. indicating that the message is indeed intended for this particular receiver), then a late entry flag is set and the incoming IV data from the data frame header is stored. This first received IV from a data frame header is not used immediately for voice data decryption but, rather, is used only to predict the IV for the next frame. Thus, a wait is made for the next frame where entry to the sync maintenance subroutine provides the IV received from the next data frame.

If the late entry flag is set, and the predicted and currently received IV's do not match, then the current IV is merely used as the "seed" for the next predicted IV to be used in the sync maintenance subroutine while continuing to inhibit the audio output. Accordingly, in the case of a late entry, two successive correctly received IV's are required before audio output is permitted to occur.

During sync maintenance (for either type of sync acquisition) the just received incoming IV stream is compared to the predicted new IV internally generated in accordance with the DES algorithm. If the late entry flag was set and a good IV comparison is made, then the sync loss counter is cleared and the correct IV may be used to generate a DES decryption vector (e.g. using the DES key from memory 28) in accordance with conventional DES algorithms.

During steady state, the receiver continues to decrypt the encrypted voice stream. Furthermore, if during steady state operation the predicted IV does not properly compare with the currently received IV, a sync loss counter is incremented and when the value exceeds a maximum (e.g. 10), the receiver is assumed to have dropped out of synchronization and attempts are then made to resynchronize the receiver with the incoming data stream. Accordingly, in the exemplary embodiment, once a steady state operation has been achieved, the receiver can "coast" for about 10 data frames (e.g. about 2.25 seconds) before synchronization is considered to have been completely lost.

While only one exemplary embodiment of this invention has been described in detail, those skilled in the art will appreciate that many modifications and variations may be made in the exemplary embodiment while yet retaining many of the novel advantages and features of this invention. Accordingly, all such variations and modifications are intended to be included within the scope of the appended claims.

What is claimed is:

1. A transceiver for reliably sending and receiving digital control and cryptographically encoded digital data signals over a communication channel subject to fading and/or noise, said transceiver comprising:
transmitter and receiver means for transmitting and/or receiving a succession of digital signals; and
control means connected to said transmitter and receiver means and including a digital data microprocessor system programmed so as to perform the following functions:
(a) initial synchronization acquisition wherein said received digital signals are scanned for an initial preamble portion from which frame synchronization, addressing and cryptographic synchronization signals are extracted,
(b) ongoing synchronization maintenance wherein said received digital signals are scanned for data frames succeeding said preamble portion, said data frames having a header portion containing the identical addressing and cryptographic synchronization signals occuring in said initial preamble portion and also including a encrypted digital data, and from which data frames at least said frame synchronization and said cryptographic synchronization signals are repeatedly extracted so as to permit maintenance of frame synchronization and ongoing cryptographic synchronization throughout the decoding of an encrypted message comprising plural such data frames, and
(c) late entry wherein, in the event frame synchronization and/or cryptographic synchronization are lost or not acquired from said preamble, said data frames are scanned and from which synchronization, addressing and cryptographic synchronization signals are nevertheless extracted and control passed back to said ongoing synchronization maintenance function such that the remaining portion of a properly addressed encrypted message data stream is nevertheless successfully decoded.

2. A transceiver for sending and receiving digital control and cryptographically encoded digital data signals over a communication channel, said transceiver comprising:
transmitter and receiver means for transmitting and/or receiving a succession of digital signals; and
control means connected to said transmitter and receiver means and including a digital data microprocessor system programmed so as to perform the following functions:
(a) initial synchronization acquisition wherein said received digital signals are scanned for an initial preamble portion from which frame synchronization, addressing and cryptographic synchronization signals are extracted,
(b) ongoing synchronization maintenance wherein said received digital signals are scanned for data frames succeeding said preamble portion and from which data frames at least said frame synchronization and said cryptographic synchronization signals are repeatedly exracted so as to permit maintenance of such synchronization throughout the decoding of an encrypted message comprising plural such data frames, and
(c) late entry wherein, in the event frame synchronization and/or cryptographic synchronization are lost or not acquired from said preamble, said data frames are scanned and from which synchronization, addressing and cryptopgraphic synchronization signals are nevertheless extracted and control passed back to said ongoing synchronization maintenance function such that the remaining portion of a properly addressed encrypted message data stream is nevertheless successfully decoded, wherein said control means is programmed to process said digital signals occurring in substantially the following time sequence:

(A) a preamble portion having:
  (1) an alternating 1,0 data pattern,
  (2) 12 repeated sets of
    (i) a 16 bit synchronization word including a multiple bit Barker code,
    (ii) a 16 bit outside address word including a multiple bit address repeated at least once,
    (iii) a 16 bit sync number code including a multiple bit number code (identifying which of the 12 repeats is involved) repeated at least once in complemented form and also including at least 1 bit of parity code,
  (3) 9 repeated sets of
    (i) a 64 bit guard band,
    (ii) a 64 bit cryptographic initialization vector,
    (iii) a 16 bit selective signalling code identifying the intended message recipient(s),
(B) successive data frames which each include
  (1) a 112 bit header portion having
    (i) a 16 bit synchronization word including a multiple bit Barker code,
    (ii) a 16 bit outside address word including a multiple bit address repeated at least once,
    (iii) a 16 bit selective signalling code identifying the intended message recipient(s),
    (iv) a 64 bit cryptographic initialization vector,
    (v) at least one of the bit fields in the header portion being distinguishable from the respectively corresponding field in the preamble so as to permit detection of a late entry condition,
  (2) a 2040 bit string of cryptographically encoded digital data, and
(C) an end-of-message word signifying the end of a given message.

3. A transceiver for reliably sending and receiving digitized and cryptographically encrypted data signals over a communication channel subject to noise and fading phenomena, said transceiver comprising:

receiver means for providing a sequence of received digital signals;

transmitter means for transmitting a sequence of generated digital signals; and digital signal processing means connected to said receiver means and to said transmitter means for processing said received digital signals into output signals and for generating said generated digital signals from signals input thereto, wherein both said received and said generated digital signals are formatted to include
  (a) an initial preamble portion which includes timing synchronization signals and cryptographic synchronization signals, and
  (b) a subsequent sequence of frames each containing encrypted data and also including, embedded therein, a portion containing the identical timing sychronization signals and cryptographic synchronization signals which are included in said initial preamble portion;

said digital signal processing means being adapted to automatically detect and monitor said embedded synchronization signals within said received digital siganls so as to maintain accurate timing and cryptographic sychronization data and so as to establish accurate timing and cryptographic synchronization even after occurrence of said preamble portion in the event of belated signal reception or temporary loss of accurate synchronization data during the course of a given received message.

4. A transceiver as in claim 3 wherein said digital signal processing means processes digital signals which include addressing signals identifying the desired message recipient both in said initial preamble portion and embedded in said frames of encrypted data, said digital signal processing means also being adapted to automatically detect and monitor said embedded address signals so as to enable belated correctly addressed receipt of a message even after occurrence of said preamble portion in the event of belated signal reception or temporary loss of accurate address data during the course of a given received message.

5. In a radio communication system for processing digitized and cryptographically encoded signals, an improved method of formatting such digital signals, said improved method comprising the steps of processing in timed sequence the below-identified digital signals:

(A) a preamble portion having:
  (1) an alternating 1,0 data pattern,
  (2) 12 repeated sets of
    (i) a 16 bit synchronization word including an 11 bit Barker code,
    (ii) a 16 bit outside address word including an 8 bit address repeated once in complemented form,
    (iii) a 16 bit sync number code including a 5 bit number code (identifying which of the 12 repeats is involved) repeated 3 times with the second repeat being in complemented form and also including 1 bit of odd parity code,
  (3) 9 repeated sets of
    (i) a 64 bit guard band,
    (ii) a 64 bit cryptographic initialization vector,
    (iii) a 16 bit selective signalling code identifying the intended message recipient(s),
(B) successive data frames which each include
  (1) a 112 bit header portion having
    (i) a 16 bit synchronization word including an 11 bit Barker code,
    (ii) a 16 bit outside address word including an 8 bit address repeated once,
    (iii) a 16 bit selective signalling code identifying the intended message recipient(s),
    (iv) a 64 bit cryptographic initialization vector,
  (2) a 2040 bit string of cryptographically encoded digital data, and
(C) an end-of-message word signifying the end of a given message.

6. A method of reliably sending and receiving control and cryptographically encoded digital data signals over a communication channel which may be subject to noise and/or fading, said method comprising:
  (a) scanning received signals for an initial preamble portion from which frame synchronization, addressing and cryptographic synchronization signals are extracted,
  (b) scanning said received digital signals for data frames succeeding said preamble portion, said data frames containing encrypted data and also containing a portion including the identical addressing and synchronization signals occurring in said initial preamble portion, and repeatedly extracting at least said frame synchronization and said cryptographic synchronization signals from said data frames so as to permit maintenance of such synchronization throughout the decoding of an encrypted message comprising plural such data frames, and (c) in the event frame synchronization and/or cryptographic synchronization are lost or not acquired from said preamble, scanning said data frames, extracting synchronization, addressing and cryptographic synchronization signals therefrom and passing control back to said scanning step (b) such that the remaining portion of a properly addressed encrypted voice message data stream is nevertheless successfully decoded.

7. A method of sending and receiving control and cryptographically encoded digital data signals over a communication channel, said method comprising:

(a) scanning received signals for an initial preamble portion form which frame synchronization, addressing and cryptographic synchronization signals are extracted, (b) scanning said received digital signals for data frames succeeding said preamble portion and from which data frames at least said frame synchronization and said cryptographic synchronization signals are repeatedly extracted so as to permit maintenance of such synchronization throughout the decoding of an encrypted message comprising plural such data frames, and (c) in the event frame synchronization and/or cryptographic synchronization are lost or not acquired from said preamble, scanning said data frames, extracting synchronization, addressing and cryptographic synchronization signals therefrom, and passing control back to said scanning step (b) such that the remaining portion of a properly addressed encrypted voice message data stream is nevertheless successfully decoded, wherein said digital signals occur in substantially the following time sequence for a complete message (A) a preamble portion having:
  (1) an alternating 1,0 data pattern,
  (2) 12 repeated sets of
    (i) a 16 bit synchronization word including a multiple bit Barker code,
    (ii) a 16 bit outside address word including a multiple bit address repeated at least once in complemented form,
    (iii) a 16 bit sync number code including a multiple bit number code (identifying which of the 12 repeats is involved) repeated at least once and also including at least 1 bit of parity code,
  (3) 9 repeated sets of
    (i) a 64 bit guard band,
    (ii) a 64 bit cryptographic initialization vector,
    (iii) a 16 bit selective signalling code identifying the intended message recipient(s), (B) successive data frames which each include
  (1) a 112 bit header portion having
    (i) a 16 bit synchronization word including a multiple bit Barker code,
    (ii) a 16 bit outside address word including a multiple bit address repeated at least once,
    (iii) a 16 bit selective signalling code identifying the intended message recipient(s),
    (iv) a 64 bit cryptographic initialization vector,
    (v) at least one of the bit fields in the header portion being distinguishable from the respectively corresponding field in the preamble so as to permit detection of a late entry condition,
  (2) a 2040 bit string of cryptographically encoded digital data, and (C) an end-of-message word signifying the end of a given message.

8. A method of reliably sending and receiving digitized and cryptographically encrypted data signals over a communication channel subject to noise and fading phenomena, said method comprising:

processing received digital signals into output signals and generating digital signals from locally input signals wherein both said received and said generated digital signals are formatted to include
  (a) an initial preamble portion which includes timing synchronization signals and cryptographic synchronization signals, and
  (b) a subsequent sequence of frames each containing encrypted data and also including, embedded therein, a portion including the identical timing synchronization signals and cryptographic synchronization signals which are included in said initial preamble portion; and automatically detecting and monitoring said embedded synchronization signals within said received digital signals so as to maintain accurate timing and cryptographic synchronization data and so as to establish accurate timing and cryptographic synchronization even after occurrence of said preamble portion in the event of belated signal reception or temporary loss of accurate synchronization data during the course of a given received message.

9. A method as in claim 8 wherein said digital signals include addressing signals identifying the desired message recipient both in said initial preamble portion and embedded in said frames of encrypted data, and automatically detecting and monitoring said embedded address signals so as to enable belated correctly addressed receipt of a message even after occurrence of said preamble portion in the event of belated signal reception or temporary loss of accurate address data during the course of a given received message.

10. A transceiver as in claim 1 wherein said control means is programmed so as to perform the following sub-functions to accomplish ongoing synchronization maintenance:
  (a) extracting a cryptographic synchronization signal value from a first data frame;
  (b) predicting the value of a crytographic synchronization signal of a further data frame to be received at a time later than the time said first data frame is received in response to said extracted cryptographic synchronization signal;
  (c) extracting a further cryptographic synchronization signal value from a further data frame received at a time later than said time said first data frame was received;
  (d) testing if said further crytographic synchronization signal value and said predicted synchronization signal value match; and
  (e) if said testing reveals said further and predicted values do not match, passing control to said late entry function such that cryptographic synchronization can be re-acquired.

11. A transceiver as in claim 10 wherein:

said control means is programmed so as to perform the following additional sub-functions to accomplish ongoing synchronization maintenance:
  (d1) repeatedly sequentially performing said sub-functions (a) through (d) for a succession of received data frames, and
  (d2) counting the number of successive times said testing reveals said further and predicted values do not match; and
conditioning the performance of said control-passing sub-function (e) on whether the number counted by said counting sub-function exceeds a predetermined number.

12. A transceiver as in claim 11 wherien said control means is programmed so as to perform the following sub-functions to accomplish said late entry function:
  (1) extracting a cryptographic synchronization signal value from a second data frame;
  (2) predicting the value of a cryptographic synchronization signal to be received at a time later than the time said second data frame is received in response to said extracted cryptographic synchronization signal;
  (3) extracting a further cryptographic synchronization signal value from a further data frame received at a time later than said time said further data frame was received;
  (4) testing if said further cryptographic synchronization signal value and said predicted synchronization signal value match;
  (5) repeatedly performing said sub-functions (1) through (4) for a succession of received data frames until said testing reveals said further and predicted values match; and
  (6) passing control back to said ongoing synchronization maintenance function when said testing reveals said further and predicted values match.

13. A transceiver as in claim 1 wherein said control means is programmed so as to perform the following sub-functions to accomplish said late entry function:
  (a) extracting a cryptographic synchronization signal value from a first data frame;
  (b) predicting the value of a cryptographic synchronization signal of a further data frame to be received at a time later than the time said first data frame was received in response to said extracted cryptographic synchronization signal;
  (c) extracting a further crytographic synchronization signal value from a further data frame received at a time later than the time said first data frame was received;
  (d) testing if said further cryptographic synchronization signal value and said predicted synchornization signal value match;
  (e) performing said sub-functions (a) through (d) for a succession of received data frames until said testing reveals said further and predicted values match; and
  (f) passing control back to said ongoing synchronization maintenance function when said testing reveals said further and predicted values match.

14. A transceiver as in claim 1 wherein said control means is programmed so as to perform the following sub-functions to accomplish initial synchronization acquisition:
  (a) extracting a plurality of versions of a synchronization value appearing redundantly within said initial preamble portion,
  (b) selecting one of said plurality of extracted versions of said synchronization value matching the majority of said plurality of extracted versions, and
  (c) determining the timing of said data frames relative to said initial preamble portion in response to said selected version.

15. A transceiver as in claim 14 wherein said control means is programmed so as to perform the following further sub-functions to accomplish initial synchronization acquisition:
  extracting a plurality of versions of at least one further value appearing redundantly within said initial preamble portion,
  testing if there exists at least a predetermined degree of correspondence between said plurality of extracted versions of said further value, and
  conditioning the performance of said selecting function (b) and said determining function (c) on the results of said testing.

16. A transceiver as in claim 1 wherein said control means is programmed so as to perform the following further functions:
  extracting an encrypted address value from said received digital signals,
  decrypting said encrypted address value in accordance with a predetermined decryption key,
  comparing said decrypted address value with a preset address value associated with said transceiver to obtain a result, and
  conditioning the performance of said initial sychronization acquisition, ongoing synchronization maintenance and late entry functions on the result of said comparison.

17. A transceiver as in claim 2 wherein said control means is programmed to process said 12 repeated sets of said 16 bit synchronization word, said 16 bit outside address word and said 16 bit sync number code over a duration in excess of a maximum expected fade duration.

18. A transceiver as in claim 2 wherein said control means is programmed to process said 9 repeated sets of said 64 bit guard band, said 64 bit cryptographic initializiation vector and said 16 bit selective signalling come over a duration in excess of a maximum expected fade duration.

19. A transceiver as in claim 2 wherein said control means is programmed to interleave the processing of said 64 bit guard band with the processing of said 64 bit cryptographic initialiation vector and said 16 bit selective signalling code.

20. A method as in claim 6 wherein said scanning step (b) includes the steps of:
  (a) extracting a cryptographic synchornization signal value from a first digital signal data frame;
  (b) predicting the value of a cryptographic synchronization signal of a further digital signal data frame to be received at a time later than the time said first data frame was received in response to said extracted cryptographic synchronization signal;
  (c) extracting a further cryptographic synchronization signal value from a digital signal data frame received at a time later than the time said first digital signal data frame was received;
  (d) testing if said further cryptographic synchronization signal value and said predicted synchronization signal value match; and
  (e) if said testing reveals said further and predicted values do not match, performing said scanning step (c) such that cryptographic synchronization can be re-acquired.

21. A method as in claim 20 wherein:
said scanning step (b) further includes the following steps:
(d1) sequentially performing said steps (a) through (d) for a succession of digital signal data frames, and
(d2) counting the number of successive times said testing step (d) reveals said further and predicted values do not match; and
said step (e) performs said scanning step (c) only if the number counted by said counting step (d2) exceeds a predetermined limit.

22. A method as in claim 21 wherein said scanning step (c) includes the following steps:
(1) extracting a cryptographic synchronization signal value from a second digital signal data frame;
(2) predicting the value of a cryptographic synchronization signal of a further digital signal data frame to be received at a time later than the time said second digital signal data frame was received in response to said extracted cryptographic synchronization signal;
(3) extracting a further cryptographic synchronization signal value from a further digital signal data frame received at a time later than the time said second digital signal data frame was received;
(4) testing if said further cryptographic synchronization signal value and said predicted synchronization signal value match;
(5) repeating said steps (1) through (4) until said testing reveals said further and predicted values match; and
(6) passing control back to said scanning step (b) when said testing step (4) reveals said further and predicted values match.

23. A method as in claim 6 wherein said scanning and passing step (c) includes the following steps:
(a) extracting a cryptographic synchronization signal value from a first digital signal data frame;
(b) predicting the value of a cryptographic synchronization signal of a further digital signal data frame to be received at a time later than the time said first data frame was received in response to said extracted cryptographic sychronization signal;
(c) extracting a further cryptographic synchronization signal value from a further data frame received at a time later than the time said first digital signal data frame was received;
(d) testing if said further cryptographic synchronization signal value and said predicted synchronization signal value match;
(e) repeating asid steps (a) through (d) for a succession of digital signal data frame until said testing reveals said further and predicted values match; and
(f) passing control back to said scanning step (b) when said testing reveals said further and predicted values match.

24. A method as in claim 6 wherein said scanning step (a) includes the following steps:
(a) extracting a plurality of versions of a synchronization value appearing redundantly within said initial preamble portion,
(b) selecting one of said plurality of extracted versions of said synchronization value matching the majority of said plurality of versions, and
(c) determining the timing of the occurrence of said data frames relative to said initial preamble portion in response to said selected version, said scanning step (b) scanning said received digital signals beginning with the occurrence of said data frames.

25. A method as in claim 24 wherein said scanning step (a) further includes the following steps:
extracting a plurality of versions of at least one further value appearing redundantly within said initial preamble portion,
testing if there exists at least a predetermined degree of correspondence between said plurality of extracted versions of said further value, and
conditioning the performance of said selecting step (b) and said determining step (c) on the results of said testing.

26. A method as in claim 6 further including the following steps:
extracting an encrypted address value from said received digital signals,
decrypting said encrypted address value in accordance with a predetermined decryption key,
compariang said decrypted address value with a preset address value to obtain a result, and
conditioning the performance of said scanning steps (a) through (c) on the result of said comparison.

27. A method as in claim 7 further including the step of receiving and/or transmitting said 12 repeated sets of said 16 bit synchronization word, said 16 bit outside address word and said 16 bit sync number code over a duration in excess of the maximum expected fade duration.

28. A method as in claim 7 further including the step of receiving and/or transmitting said 9 repeated sets of said 64 bit guard band, said 64 bit cryptographic initialization vector and said 16 bit selective signalling code over a duration in excess of the maximum expected fade duration.

29. A method as in claim 7 further including the step of receiving and/or transmitting said 64 bit guard band interleaved with said 64 bit cryptographic initilization vector and said 16 bit selective signalling code.

30. A method as in claim 6 wherein said method further includes the steps of:
(1) transmitting a synchronization sequence including a plurality of redundant fields of digital frame and addressing synchronization signals for a duration in excess of a predetermined maximum expected fade duration;
(2) subsequent to said transmitting step (1), sequentially transmitting a guard band field and a further field of digital encryption synchronization signals each for a duration selected to obtain a desired degree of fade protection; and
(3) repeating said sequentially transmitting step (2) a plurality of times to obtain a sequence of interleaved transmitted guard band fields and encryption synchronization signal fields and said scanning step includes scanning said signals transmitted by steps 1-3.

31. A method as in claim 6, wherein said scanning step (a) includes the following steps
(1) receiving a synchronization sequence including a plurality of redundant fields of digital frame and addressing synchronization signals for a duration in excess of a predetermined maximum expected fade duration;

(2) voting on said received redundant frame and addressing synchronization signal fields to select the received version of said frame and addressing synchronization signal field with the highest frequency of receipt;

(3) subsequent to said receiving step (1), receiving a sequence of fields including a guard band field and a further field of digital encryption synchronization signals each having a duration selected to obtain a desired degree of fade protection;

(4) repeating said receiving step (3) a plurality of times to obtain a sequence of redundant, interleaved received guard band fields and encryption synchronization signal fields; and (5) voting on said received redundant encryption synchronization signal fields to select the received version of said encryption synchronization signal field with the highest frequency of receipt.

32. A system as in claim 1 wherein said ongoing synchronization maintenance and late entry functions each include extracting signals from a header portion of said data frames, said header portion containing said frame synchronization signals, cryptographic synchronization signals, and addressing signals, said signals being redundant with the frame synchronization, cryptographic synchronization and addressing signals contained in said initial preamble portion, said header portion being substantially shorter than said initial preamble portion, said frames each also including a data field containing encrypted digital data signals.

33. A transceiver as in claim 3 wherein said frames in said subsequent each include a header portion containing frame synchronization signals, cryptographic sychronization signals, and addressing signals, said signals being redundant with frame synchronization, cryptographic synchronization and addressing signals contained in said initial preamble portion, said header portions being substantially shorter than said initial preamble portion, said frames each also including a data field containing encrypted digital data signals.

34. A method as in claim 6 wherein steps (b) and (c) each includes:

scanning said received data frames for a header portion containing aid frame synchronization signals, cryptographic synchronization signals, and addressing signals, said signals being redundant with frame synchronization, cryptographic synchronization and addressing signals contained in said initial preamble portion, said header portions being substantially shorter than said initial preamble portion, and extracting said cryptographic synchronization, frame synchronization and addressing signals from said subsequent frame header portions, said frames each also including a data field containing encrypted digital data signals.

35. A method as in claim 8 wherein said subsequent sequence of frames are each formatted to include:

a header portion containing frame synchronization signals, cryptographic synchronization signals, and addressing signals, said signals being reundant with frame sychronization, crytographic synchronization and addressing signals contained in said initial preamble portion, said header portions being substantially shorter than said initial preamble portion, and a data field containing encrypted digital data signals.

* * * * *